(12) United States Patent  
Artzner et al.

(10) Patent No.: US 6,298,709 B1
(45) Date of Patent: Oct. 9, 2001

(54) SENSOR DEVICE

(75) Inventors: Johannes Artzner, Reutlingen; Wolfram Bauer, Tuebingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,491

(22) PCT Filed: Aug. 25, 1998

(86) PCT No.: PCT/DE98/02484

§ 371 Date: Jun. 2, 2000

§ 102(e) Date: Jun. 2, 2000

(87) PCT Pub. No.: WO99/13345

PCT Pub. Date: Mar. 18, 1999

(30) Foreign Application Priority Data

Sep. 11, 1997 (DE) .................................. 197 39 903

(51) Int. Cl.⁷ ...................................... G01P 21/02
(52) U.S. Cl. ............................................. 73/1.38
(58) Field of Search .................... 73/1.37, 1.38, 73/1.02, 1.08, 1.16, 1.57

(56) References Cited

U.S. PATENT DOCUMENTS

| 5,287,724 | * | 2/1994 | White et al. | 73/1.38 |
| 5,377,523 | * | 1/1995 | Ohta et al. | 73/1.38 |
| 5,429,736 | * | 7/1995 | Shimada et al. | 73/1.38 |
| 5,445,006 | * | 8/1995 | Allen et al. | 73/1.38 |
| 5,631,602 | * | 5/1997 | Kearney et al. | 73/1.38 |
| 6,029,497 | * | 2/2000 | Brinks et al. | 73/1.38 |
| 6,035,694 | * | 3/2000 | Dupuie et al. | 73/1.38 |

FOREIGN PATENT DOCUMENTS

| 38 09 299 | 9/1989 | (DE) . |
| 44 43 941 | 6/1996 | (DE) . |
| 44 47 005 | 7/1996 | (DE) . |
| 88 01242 | 2/1988 | (WO) . |

* cited by examiner

Primary Examiner—Robert Raevis
(74) Attorney, Agent, or Firm—Kenyon & Kenyon

(57) ABSTRACT

A device for the determination of a measured variable, a motion variable in particular, is described. At its output, the device signals a malfunction via a fixed voltage level at the output. The device includes a self-test module that functions concurrently with a measurement operation without external triggering and interrupting or interfering with the actual measurement.

9 Claims, 2 Drawing Sheets

SENSOR DEVICE

FIELD OF THE INVENTION

The present invention relates to a sensor device.

BACKGROUND OF THE INVENTION

A sensor device with a testing module that checks the sensor device for a possible malfunction is described in German Patent No. 44 47. This testing module must be activated externally by actuating a test input. In doing so, the sensor is detuned in the testing phase by an interference signal. The interference signal corresponds to a specific value of a measured variable to be tested.

SUMMARY OF THE INVENTION

In contrast, the device according to the present invention has the advantage that it represents an inherently reliable sensor that continuously carries out a self-test and accordingly identifies malfunctions in the mechanical and/or electronic systems without detuning the sensor and thereby influencing the measurement function. At the same time, no external triggering and no external additional circuitry is necessary; a three-pin terminal connection (voltage supply+ signal output) can be implemented. As a result, there exists downward compatibility with already existing sensors that do not have a self-test module and have such a connection. These existing sensors can be advantageously replaced by the device according to the invention.

DETAILED DESCRIPTION

Figure 1:
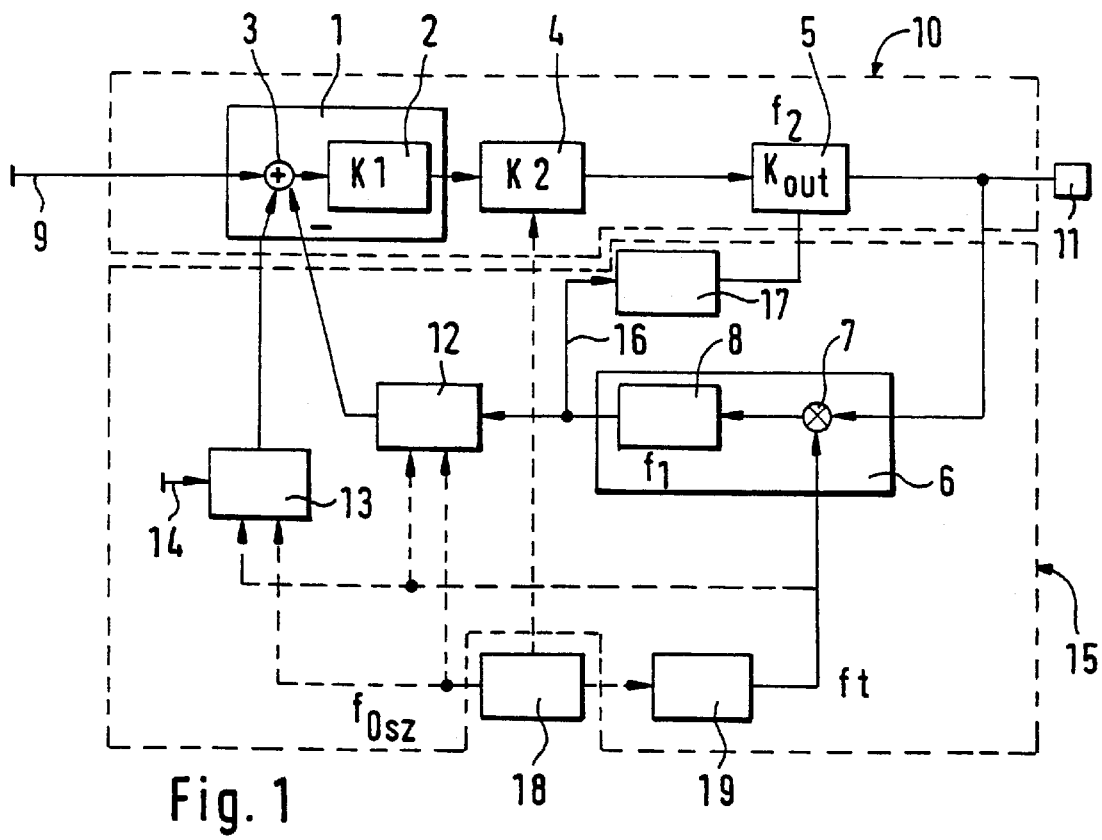
FIG. 1 shows a first embodiment according to the present invention.

FIG. 1 shows a measurement and analysis unit 10 having a measurement input 9 and an outset 11. A self-test module 15 is electrically connected to measurement and analysis unit 10. Measurement and analysis unit 10 has a measuring element 1, which is connected to input 9 via a summing point 3. Measuring element 1 has a sensor transfer function 2, which possesses the value K1. The output of the measuring element is connected to an analysis circuit 4 with an analysis transfer function K2. The output of analysis circuit 4 is in turn electrically connected to an amplifier 5 which has gain $K_{out}$ and an upper cutoff frequency f2. The output of amplifier 5 is connected to output 11. Self-test module 15 has a frequency-selective detection means in the form of a synchronous demodulator 6, which is connected to output 11. Synchronous demodulator 6 has a demodulator 7 and an I-controller 8. The I-controller 8 has an upper cutoff frequency f1. Moreover, an oscillator 18 is provided that feeds a signal having a test frequency ft into the demodulator via a frequency divider 19. Demodulator 7 supplies its output signal to I-controller 8, which in turn is electrically connected via a reverse signal lead 16 to an interrupt logic circuit 17 having a window comparator. Interrupt logic circuit 17, in turn, is electrically connected to amplifier 5 of measurement and analysis unit 10. In addition to interrupt logic circuit 17, the output of the synchronous demodulator is connected to an electrostatic voltage-force converter 12. Voltage-force converter 12 supplies a compensation signal to summing point 3. In the exemplary embodiment, the measuring element is, for example, an acceleration sensor. An inertial force proportional to an acceleration to be measured is present at an input 9 of the measuring element 1. Self-test module 15 has a test amplitude generator, which is not shown in FIG. 1 that relays a test amplitude 14 to an electrostatic test voltage-force converter 13, which feeds a test voltage into summing point 3. Voltage-force converter 12 and test voltage-force converter 13 obtain the signal frequency from frequency divider 19. Oscillator 18 supplies a signal with an oscillator frequency fosz to analysis circuit 4, voltage-force converter 12 and test voltage-force converter 13.

Figure 2:
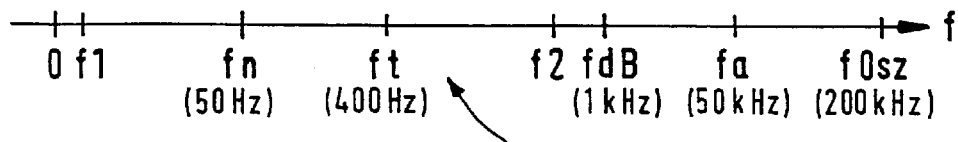
FIG. 2 shows frequency relationships of the first embodiment shown in FIG. 1.

Measuring element 1, designed as a capacitive acceleration sensor, detects an inertial force proportional to an acceleration via a deflection of a movable element of the measuring element. The effect of the inertial force on measuring element 1 is represented by input 9 in FIG. 1. Value K1 of the sensor transfer function is the quotient of the change in position of the movable element and the effective inertial force. The change in position of the movable element is analyzed in analysis circuit 4 and converted into a voltage change. The standard for this is analysis transfer function K2, which is proportional to the deflection of the movable element. In this connection, the movable element is a part of two capacitances, the capacitance change of which is converted into a voltage signal in the analysis circuit as a result of the deflection of the movable element. In a first refinement of the first exemplary embodiment, the analysis takes place by switched capacitor technology (SC technology) in a sample and hold circuit. The scanning frequency with which the analysis circuit "scans" the change in capacitance is, for example, the fourth fractional part of the oscillator frequency of oscillator 18. The voltage signal of analysis circuit 4 is amplified with gain $K_{out}$ in a downstream amplifier 5; the amplified voltage signal can be picked off at output 11. The oscillator frequency is, for example, 200 kHz, the scanning frequency fa is accordingly 50 kHz. A frequency trace with the frequencies relevant to the device according to FIG. 1 is shown in FIG. 2. The acceleration values to be measured range, for example, from a frequency of 0 to 50 Hz, the maximum useful frequency being identified as fn in FIG. 2, i.e., the maximum frequency of such acceleration changes over time that are still to be detected with the measuring element. Measurement and analysis unit 10 represents an open loop since no feedback to the amplifier is provided in the sequence from the measuring element via the analysis circuit for the analysis of the acceleration signal to be measured. In this connection, the upper cutoff frequency f2 of amplifier 5 must be greater than the maximum useful frequency fn (see FIG. 2 in which the frequency relationships 28 are shown in the open loop arrangement). f2 must also be greater than a test frequency ft, which is, for example, 400 Hz and is thus in turn greater than the maximum useful frequency fn. The 3-dB limit frequency of the measuring element is, for example, greater than the upper cutoff frequency of amplifier 5 (see FIG. 2 in which a value of 1 kHz is specified as an example for the 3-dB limit frequency, the value being entered to the right of the upper cutoff frequency). Test frequency ft is the frequency of the test signal that is superimposed on the measured variable with electrostatic test voltage-force converter 13. The test amplitude generator supplies a test amplitude that the test voltage-force converter uses to superimpose a test voltage signal with the test frequency, which is greater than the maximum useful frequency, on the measured variable by superimposing an additional force on the measured variable, i.e., the inertial force. Since upper cutoff frequency f2 of amplifier 5 is greater than the test frequency, the test signal, which is converted into a voltage signal, is transmitted by amplifier 5 and can be detected by synchronous demodulator 6. Demodulator 7 demodulates the output signal of amplifier 5 in a frequency-selective manner with test frequency ft. The I-controller functions as a low pass filter with a cutoff frequency f1. Its output signal is a voltage signal used to activate electrostatic voltage-force converter 12. This voltage-force converter 12 superimposes a compensation signal on the measured variable in order to compensate—as described above—the supplied test signal. Voltage-force converter 12 as well as test voltage-force converter 13 are executed as circuit components that are present at electrodes provided in the capacitive acceleration sensor in order to bring about a suitable deflection or compensation deflection of the movable element of the capacitive acceleration sensor corresponding to the voltage signals. If measurement and analysis unit 10 is in proper order, the test signal is completely compensated by the compensation signal and a direct voltage is present at the output of I-controller 8, the direct voltage corresponding to test amplitude 14. If measurement and analysis unit 10 is not in proper order because either the mechanical measuring element is damaged or the electronic system does not function properly, the signal component with test frequency ft is amplified at output 11. This amplification takes place via the loop formed by synchronous demodulator 6 and voltage-force converter 12, the loop representing a negative feedback loop for test frequency signal components for the open loop of measurement and analysis unit 10. Since I-controller 8 functions as an integrator, it integrates a signal amplitude present for an extended time with test frequency ft at output 11; thus an extreme value (maximum or minimum voltage value) is present in this case at the output of I-controller 8, the extreme value activating the interrupt logic circuit via reverse signal lead 16. A window comparator assigned to interrupt logic circuit 17 registers that the voltage value of the reverse signal lead is not in a certain window which means that measurement and analysis unit 10 is not functioning properly. Accordingly, interrupt logic circuit 17 disconnects amplifier 5 or assigns a fixedly defined voltage value to output 11 of measurement and analysis unit 10 via the is electrical connection between interrupt logic circuit 17 and amplifier 5. The voltage value is recognized as a fault signal by the external electronic system connected at output 11. If measurement and analysis unit 10 functions properly, a voltage value is present at the output of the I-controller This voltage value corresponds to test amplitude 14 generated by the test amplitude generator. Accordingly, the window comparator of interrupt logic circuit 17 is designed in such a way that it recognizes a malfunction of measurement and analysis unit 10 as soon as the voltage value present at the output of the I-controller is not within a value range approximating test amplitude 14, which is defined by the window comparator. Cutoff frequency f1 of I-controller 8, also named robustness frequency, defines the robustness of the self-test control loop formed by the open loop of measurement and analysis unit 10 and the feedback loop with regard to the useful signals occurring at test frequency ft. I-controller 8 only transmits voltage components in an integrative manner that occur with the test frequency at output 11. Cutoff frequency f1 is as low as possible in order to preclude upward integration of acceleration force signal components with the test frequency. With a given low cutoff frequency f1 ($0<f1<fn$), such an upward integration is precluded since the acceleration forces to be measured customarily are within the useful band provided by maximum useful frequency fn. Thus acceleration forces with 400 Hz signal components are never present at the measuring element long enough and with a large enough magnitude to become noticeable at the output of I-controller 8. From the above remarks, it is thus evident that the self-test carried out by self-test module 15 is superimposed on the original operation that is defined by the measured value recording performed by the open loop of the measurement and analysis unit and has no effect on the recording of the measured value because the frequency components of the variable to be measured in the frequency range of interest, which is specified by maximum useful frequency fn, are below test frequency ft and the test signal is compensated by the self-test control loop. Thus, it is a frequency-selective monitoring method without influencing the function of the measurement and analysis unit and external triggering. A test signal is no longer present at sensor output 11 apart from a very slight system deviation, i.e., the self-test is not visible to the outside. Only in the event of a malfunction is output 11 assigned a defined voltage level. The analysis of the capacitance change by the analysis circuit and the application of electrostatic forces via the voltage-force converter and test voltage-force converter 12 and 13, respectively, take place by a time-division multiplex method, i.e., advantage is taken of the fact that the mechanical measuring element is slow-acting in relation to the time period corresponding to the scanning frequency. A condition for the time-division multiplex method is that the scanning frequency fa, which amounts, for example, to the fourth fractional part, i.e., 50 kHz, of oscillator frequency fosz, is large in comparison to the 3-dB limit frequency of the measuring element. The 3-dB limit frequency of the measuring element determines the frequency range of signal components that may be measured reliably (thus, for example, acceleration force components with frequencies up to 1 KHz in the embodiment). Oscillator 18, which via a frequency divider 19, supplies a signal with the test frequency that is used in demodulator 7 for demodulation and in the voltage-force converters and test voltage-force converters to generate a test and compensation signal, respectively. The oscillator 18 also triggers analysis circuit 4 and voltage-force converters 12 and 13. Test voltage-force converter 13 is triggered in a first step analysis circuit 4 is triggered in a second step and a compensation signal is applied by voltage-force converter 12 in a third step. The measured value scanning, i.e., the activation of analysis circuit 4 by oscillator 18, takes place at the named scanning frequency, thus for example, 50 KHz. The fact that the scanning frequency is high compared to the 3-dB limit frequency of the measuring element makes it possible for the regular recording of measured values to take place directly after application of the test signal, "although" amplifier 5 does not filter out signal components with the test frequency since the measuring element is too slow-acting to react to an applied test signal in the cycle of the scanning frequency. Only after many periods of the scanning frequency is a possibly anomalous operating state evident at output 11, i.e., a signal component with the test frequency significantly different from zero. As an alternative to the time-division multiplex method of analysis, a carrier frequency method of analysis may also be used. In this case, the connection between oscillator 18 and test voltage-force converters and voltage-force converters 13 and 12, respectively, is eliminated in FIG. 1. The connection between oscillator 18 and analysis circuit 4 is retained since in this case, i.e., the second refinement of the first exemplary embodiment, the oscillator supplies the carrier frequency for analysis circuit 4 upon which the useful signal is modulated (amplitude modulation). In this case, the analysis and test signal can be simultaneous, although the test signal is applied and the measured value is picked off by test voltage converter 13 and analysis circuit 4, respectively, at the same pick-off of the movable element of the mechanical measuring element, since as a consequence of the carrier frequency analysis, test signal applications and analysis do not mutually influence each other. In this connection, it must be observed that in FIG. 1, the summing point schematically represents the superimposition of the physical measured variable, test signal and compensation signal. For purposes of circuitry, the test signal application as well as the compensation signal application and analysis are implemented via the same connections to mechanical measuring element 1.

Synchronous demodulator 6 may be replaced by a bandpass filter with downstream amplitude analysis, the bandpass frequency being equal to the test frequency.

In an advantageous manner, analysis circuit 4, amplifier 5, self-test module 15 and oscillator 18 may be integrated on a chip. The exemplary embodiment is also not limited to measurements of inertial force and acceleration but rather it is generally applicable to time-dependent measured variables. Correspondingly, converters 12 and 13, respectively, must be designed accordingly in order to bring about a suitable voltage conversion.

Figure 3:
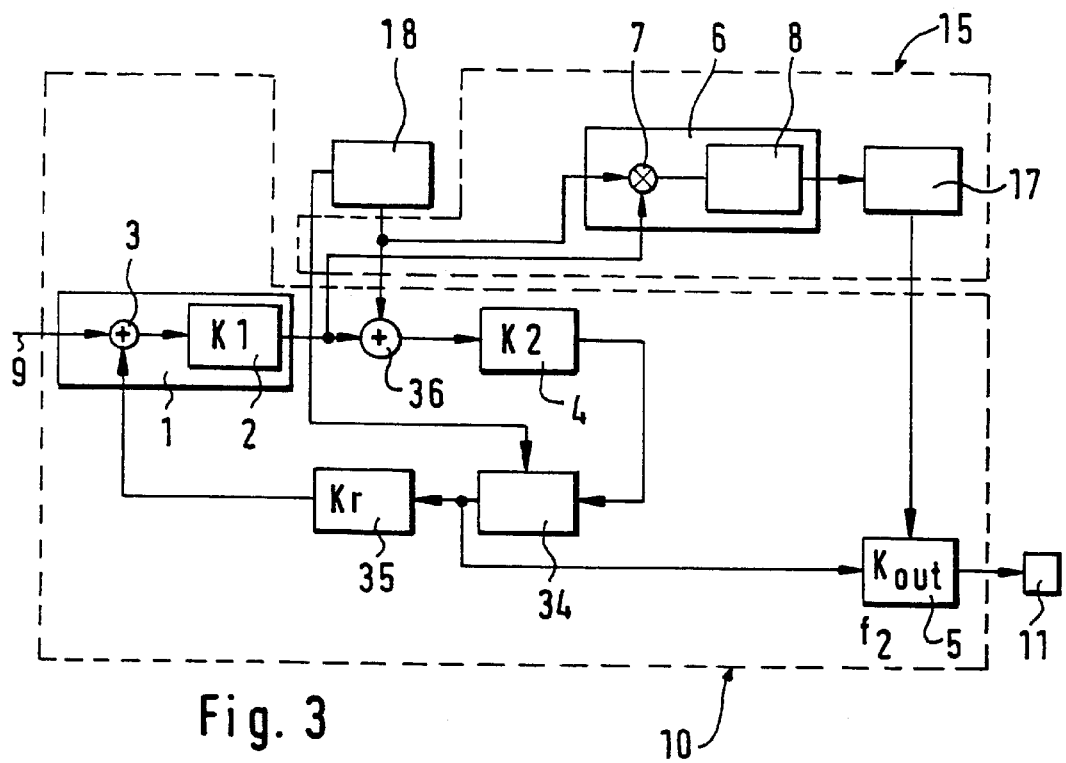
FIG. 3 shows a second embodiment according to the present invention.

FIG. 3 shows a second exemplary embodiment of a measurement and analysis unit 10 with a correspondingly modified self-test module 15. In this second exemplary embodiment, measurement and analysis unit 10 represents a closed loop, in contrast to the open loop of the first exemplary embodiment according to FIG. 1. Identical or similar circuit components are provided with the same reference symbols and are not described again. Analysis circuit 4 is connected to a pulse-width modulator 34 that activates an electrostatic signal voltage-force converter 35 (signal converter function Kr). At summing point 3, this signal voltage-force converter in turn exercises a force on mechanical measuring element 1 simultaneously with the external inertial force. The closed circuit arrangement of mechanical measuring element 1, analysis circuit 4, pulse-width modulator 34 and signal voltage-force converter 35 results in a closed loop arrangement. The physical measured variable present at the input, i.e. the useful signal proportional to the inertial force, is picked off at the output of pulse-width modulator 34 and output at output 11 after amplification in amplifier 5.

Figure 4:
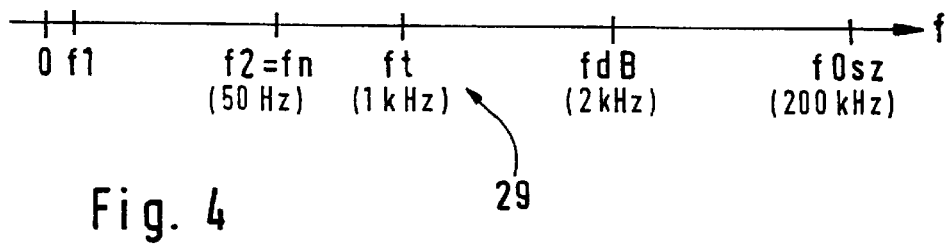
FIG. 4 shows frequency relationships of the second embodiment shown in FIG. 3.

Apart from a small system deviation, the mechanical movable element of a measuring element 1 in the form of an acceleration sensor always remains in the same position; the electrical variable for compensation of the deflection of the mechanical element as a result of the effective inertial force simultaneously is the electrical signal which th can be picked off at output 11, and proportional to the inertial force. The pulse-width modulator activates the signal voltage-force converter with a signal having the frequency of oscillator 18, thus for example 200 KHz. The pulse width of this signal is varied with the output signal of analysis circuit 4. The oscillator frequency is also large in relation to all other characteristic frequencies of the arrangement according to FIG. 3 (see FIG. 4 in which frequency relationships 29 are shown in the closed loop arrangement). In comparison to FIG. 1, an additional summing point 36 is provided in the second exemplary embodiment according to FIG. 3. The additional summing point is located between the output of measuring element 1 and the input of analysis circuit 4. In this embodiment, sensor transfer function 2 has a value K1 that corresponds to the quotient of the resulting output voltage of measuring element 1 and the associated physical measured variable, for example, an acceleration. In normal operation when all circuit components are in proper order, this test signal is also adjusted by this closed loop arrangement, just as the useful signal, which in contrast to the test signal having a test frequency of 1 KHz, for example, only has frequencies of interest from 0 to, for example, 50 Hz as a maximum useful frequency fn (FIG. 4). Only a voltage proportional to the physical variable to be measured is present at output 11 of measurement and analysis unit 10 since amplifier 5 connected upstream of output 11 has a cutoff frequency f2 which corresponds to maximum useful frequency fn (FIG. 4); i.e., signal components with test frequency ft present at the output of the pulse-width modulator are filtered out. Between measuring element 1 and summing point 36, demodulator 7 picks off the voltage present at the output of the measuring element. In normal operation, this voltage will correspond entirely with the inverted test signal so that a signal with the test frequency is not present at the output of summing point 36. Synchronous demodulator 6 in this case does not activate interrupt logic circuit 17; output 11 is isolated and delivers voltage signals proportional to the measured variable. If, however, the loop arrangement is separated, the measuring element is mechanically damaged, or another electronic component of measurement and analysis circuit 10 is out of proper service condition, the signal component at the output of mechanical measuring element 1 is different from the test frequency of the test amplitude; the synchronous demodulator detects this via a signal located at the output of lowpass filter 8 that is different from the test signal and if this value is outside a specific tolerance range, amplifier 5 is "switched off" via interrupt logic circuit 17 in that output 11 is assigned a fixed voltage level.

What is claimed is:

1. A device for determining a time-dependent measured variable within a useful band of the time-dependent measured variable, the device comprising:

a measurement circuit including a measuring element and an analysis arrangement, the measuring element supplying a measurement signal, the analysis arrangement obtaining an output voltage from the measurement signal, the output voltage representing the time-dependent measured variable, the measurement signal being present at an output of the device; and a self-test module for superimposing a test signal with a test frequency above the useful band on the time-dependent measured variable, the test signal being superimposed concurrently with the determination of the time-dependent measured variable, the self-test module including a frequency-selective detection device, a voltage-force converter, and an interrupt logic circuit, the frequency-selective detection device picking off a reaction of the measurement circuit to the test signal at the output, the voltage-force converter being capable of activation via an output of the frequency-selective detection device so that a signal for compensating the test signal may be superimposed on the time-dependent measured variable, the interrupt logic circuit being capable of activation from the output of the frequency-selective detection device with a window comparator, the interrupt logic circuit detecting whether the reaction of the measurement circuit is outside of a value range, the interrupt logic circuit assigning a fixed voltage level to the output of the measurement circuit when the reaction of the measurement circuit is outside of the value range.

2. The device according to claim 1 wherein:

the detection device includes a demodulator and at least one of an I-controller and a lowpass filter.

3. The device according to claim 1 wherein:

the detection device includes a bandpass filter and a downstream amplitude analysis circuit, the bandpass filter having the test frequency as a filter frequency.

4. The device according to claim 1 further comprising:

an oscillator having an oscillator frequency, the oscillator being capable of generating a signal via a frequency divider using the test frequency.

5. The device according to claim 1 wherein:

an input of the measurement circuit, the measuring element, the analysis arrangement, and the output of the measurement circuit form an open loop.

6. The device according to claim 1, wherein:

the analysis arrangement includes an analysis circuit and a downstream amplifier, the analysis circuit generating a voltage correlated with the time-dependent measured variable, the downstream amplifier having a cutoff frequency above the test frequency.

7. The device according to claim 1 wherein: self-test module further includes a test voltage-force converter used to superimpose the test signal on the time-dependent measured variable, an amplitude of the test signal being determined by a test amplitude generated by a test amplitude generator.

8. The device according to claim 4, wherein:

the analysis arrangement, the voltage-force converter, and a test voltage-force converter may be triggered via the oscillator, a scanning rate of the analysis arrangement being greater than a 3-dB limit frequency of the measuring element, the analysis arrangement, the voltage-force converter, and the test voltage-force converter being alternately triggerable in succession.

9. The device according to claim 4, wherein the analysis arrangement, the oscillator, and the self-test module are situated on a chip.

* * * * *

UNITED STATES PATENT AND TRADEMARK OFFICE
CERTIFICATE OF CORRECTION

PATENT NO. : 6,298,709 B1 Page 1 of 1
DATED : October 9, 2001
INVENTOR(S) : Artzner et al.

It is certified that error appears in the above-identified patent and that said Letters Patent is hereby corrected as shown below:

Column 1,
Line 10, change "44 47." to -- 44 47 005. --
Line 45, change "outset" to -- output --

Column 3,
Line 47, change "the is" to -- the --

Column 4,
Line 47, change "step" to -- step, --

Column 5,
Line 56, change "element" to -- element, --
Line 56, change "force" to -- force, --
Line 57, change "signal" to -- signal, --
Line 57, change "which th can" to -- which can --

Signed and Sealed this

Twenty-fifth Day of February, 2003

JAMES E. ROGAN
*Director of the United States Patent and Trademark Office*